United States Patent
Mainieri et al.

(10) Patent No.: US 9,860,262 B2
(45) Date of Patent: Jan. 2, 2018

(54) METHODS AND SYSTEMS FOR ENCODING COMPUTER PROCESSES FOR MALWARE DETECTION

(71) Applicant: PERMISSIONBIT, McLean, VA (US)

(72) Inventors: Ronnie Mainieri, Vienna, VA (US); Curtis A. Hastings, Bethesda, MD (US)

(73) Assignee: PERMISSIONBIT, McLean, VA (US)

( * ) Notice: Subject to any disclaimer, the term of this patent is extended or adjusted under 35 U.S.C. 154(b) by 199 days.

(21) Appl. No.: 14/960,066

(22) Filed: Dec. 4, 2015

(65) Prior Publication Data
US 2016/0164901 A1    Jun. 9, 2016

Related U.S. Application Data

(60) Provisional application No. 62/088,324, filed on Dec. 5, 2014.

(51) Int. Cl.
*H04L 29/06* (2006.01)
*G06N 7/00* (2006.01)
(Continued)

(52) U.S. Cl.
CPC ........ *H04L 63/1425* (2013.01); *G06F 21/554* (2013.01); *G06F 21/566* (2013.01);
(Continued)

(58) Field of Classification Search
CPC ......... H04L 63/00; H04L 63/02; H04L 63/14; H04L 63/1408; H04L 63/1416;
(Continued)

(56) References Cited

U.S. PATENT DOCUMENTS

| | | | |
|---|---|---|---|
| 7,181,768 B1 * | 2/2007 | Ghosh | G06F 21/552 706/25 |
| 7,318,163 B2 * | 1/2008 | Armingaud | G06F 21/554 713/193 |

(Continued)

OTHER PUBLICATIONS

Mehdi et al. "Towards a Theory of Generalizing System Call Representation for in-Exectuion Malware Detection" [Online], 2010 IEEE International Conference on, May 1, 2010 [Retrieved on Aug. 9, 2017], pp. 1-5, Retrieved from: < http://ieeexplore.ieee.org/stamp/stamp.jsp?arnumber=5501969 >.*

(Continued)

*Primary Examiner* — Eric W Shepperd
(74) *Attorney, Agent, or Firm* — Roberts Mlotkowski Safran Cole & Calderon, P.C.

(57) ABSTRACT

A method for encoding computer processes for malicious program detection. The method includes the steps of (a) randomly sampling a trace of system calls collected over a predetermined interval, each system call including context information and memory addresses for the function being monitored; (b) computing system address differences from the trace of system calls and retaining the computed values; (c) forming a group of n-grams (words) of retained differences of system addresses from the trace of system calls; (d) forming a series of process snippets, each process snippet including context information and the retained differences of system addresses; (e) transforming each process snippet to form a compact representation (process dot) comprising a pair of elements ⟨c, a⟩, wherein c includes the context information and a is a sparse vector that encodes information derived from the group of n-grams; (f) forming clusters of compact representations; (g) obtaining clusters of compact representations from one or more malicious program-free computers; and (h) comparing the clusters formed in step (f)

(Continued)

to those obtained in step (g) and determining the presence of malicious program from the comparison.

40 Claims, 5 Drawing Sheets

(51) Int. Cl.
  *G06N 99/00* (2010.01)
  *G06F 21/55* (2013.01)
  *G06F 21/56* (2013.01)

(52) U.S. Cl.
  CPC ........... *G06N 7/005* (2013.01); *G06N 99/005* (2013.01); *H04L 63/1441* (2013.01)

(58) Field of Classification Search
  CPC . H04L 63/1425; H04L 63/1441; G06F 21/50; G06F 21/52; G06F 21/55; G06F 21/554; G06F 21/56; G06F 21/566; G06N 7/005; G06N 99/005
  See application file for complete search history.

(56) References Cited

U.S. PATENT DOCUMENTS

| | | | |
|---|---|---|---|
| 7,996,836 B1* | 8/2011 | McCorkendale | G06F 21/53 713/164 |
| 9,720,925 B1* | 8/2017 | Lawson | G06F 17/301 |
| 2004/0181677 A1* | 9/2004 | Hong | G06F 21/563 713/188 |
| 2006/0143707 A1* | 6/2006 | Song | G06F 21/52 726/22 |
| 2007/0198789 A1* | 8/2007 | Clark | G06F 11/1448 711/162 |
| 2008/0196102 A1* | 8/2008 | Roesch | G06F 21/55 726/23 |
| 2009/0199294 A1* | 8/2009 | Schneider | G06F 21/316 726/18 |
| 2011/0209220 A1* | 8/2011 | Tikkanen | G06F 9/442 726/24 |
| 2011/0289582 A1* | 11/2011 | Kejriwal | G06F 21/566 726/22 |
| 2013/0275582 A1* | 10/2013 | Gedam | H04L 43/16 709/224 |
| 2013/0283370 A1* | 10/2013 | Vipat | G06F 21/44 726/17 |
| 2014/0090061 A1* | 3/2014 | Avasarala | G06F 21/56 726/24 |
| 2014/0201495 A1* | 7/2014 | Hyuseinova | G06F 12/1009 711/207 |
| 2015/0160998 A1* | 6/2015 | Anvin | G06F 12/14 714/807 |
| 2015/0205963 A1* | 7/2015 | Zou | G06F 21/566 726/23 |
| 2015/0288711 A1* | 10/2015 | Jorgensen | H04L 63/1441 726/23 |

OTHER PUBLICATIONS

Zhuowei et al. "Utilizing statistical characteristics of N-grams for intrusion detection" [Online], Cyberworlds, 2003, Proceedings, 2003 International Conference on Dec. 3-5, 2003 [Retrieved on: Aug. 9, 2017], pp. 486-493, Retrieved from: < http://ieeexplore.ieee.org/stamp/stamp.jsp?arnumber=1253494 >.*

Wressnegger et al. "A close look on n-grams in intrusion detection: Anomaly Detection vs. Classification" [Online], Artificial Intelligence and Security, ACM, Nov. 4, 2013 [Retrieved on: Aug. 9, 2017], pp. 67-76, Retrieved from: < http://dl.acm.org/citation.cfm?id=2517316 >.*

Warrender et al. "Detecting intrusions using system calls: alternative data models" [Online], 1999 IEEE Symposium May 9-12, 1999 [Retrieved on: Aug. 9, 2017], pp. 133-145, Retrieved from: < http://eprints.maynoothuniversity.ie/1418/1/DetectingIntrusions.pdf >.*

International Search Report and Written Opinion of PCT/US2015/064068 dated Mar. 4, 2016.

Mehdi et al. "Towards a Theory of Generalizing System Call Representation for in-Execution Malware Detection" Communications (ICC), May 1, 2010.

Zhuowei et al. "Utilizing Statistical Characteristics of N-grams for Intrusion Detection" Cyberworlds, pp. 486-493 Dec. 3, 2003.

Wressnegger et al. "A close look on n-grams in intrusion detection", Artificial Intelligence and Security, Nov. 4, 2013.

Warrender et al., "Detecting intrusions using system calls: alternative data models", Security and Privacy, Jan. 1, 1999.

International Preliminary Report on Patentability of PCT/US2015/064068 dated Jun. 6, 2017.

* cited by examiner

Figure 5

METHODS AND SYSTEMS FOR ENCODING COMPUTER PROCESSES FOR MALWARE DETECTION

RELATED APPLICATION

This application claims priority from U.S. Provisional Application Ser. No. 62/088,324, filed on Dec. 5, 2014 the contents of which are hereby incorporated by reference in their entirety.

FIELD

The present disclosure relates to systems and methods for malware detection.

BACKGROUND

General purpose computers in the form of a CPU afford engineers and other makers a versatile component to achieve design goals. Yet, their ever increasing complexity promotes an incremental design style where functionality is refined after observing earlier versions of the device in use. This design strategy is not a convenience, but a consequence of the general purpose nature of the CPU and the impossibility of predicting its behavior in general except by observing it operate (see the halting problem in Turing 1936). The design difficulties of devices incorporating CPUs facilitate their exploitation by utilizing their unforeseen modes of operation. A cyber security industry has arisen to understand and thwart such exploits.

Current tools used by cyber security industry tend to systematize the practice of its experts. Through this approach, network practices become the domain of firewalls and forensic tactics to identify malicious program files become the domain of security information and event management systems. As the techniques used by experts and programs to protect computers disseminate, malicious program developers create new techniques to circumvent them, leading to an escalation in the complexity of tactics employed by both camps.

Efficiency considerations in current hardware require that only a subset of activities (often called events or indicators) of an executing program be monitored in any possible malicious program analyses. Common choices include observing changes to the long-term data storage subsystem, log activities, or network flows. The need arises to have a representation of executing code richer in information than current indicators yet sufficiently compact so that it may be manipulated without presenting an undue burden on the device being monitored.

As may be appreciated, a computer, in this case, is any collection of CPUs that can share threads of execution, memory, and data.

SUMMARY

Disclosed herein are systems and methods that use machine learning techniques to rank machines according to their probability of being compromised. The system operates by collecting small amounts of information on a continual basis from all machines within a set (which could have only one element). The information is then processed on a server program to determine the probability that each individual machine is compromised or conducting abnormal activities (such as a user attempting to ex-filtrate data). Rankings based on probability have operational advantages over simple yes-no indications of compromise, as they help prioritize activities, allowing computer security personnel to concentrate their efforts where they are most needed. In environments with standard security needs, the disclosed systems and methods may enable computer security personnel to limit their activities to checking only machines that are above a certain threshold, whereas in environments requiring higher security, the top few machines could be checked regardless of the probability of their compromise. The systems and methods disclosed herein use features of a set of computers under protection when many elements are available.

In one aspect, disclosed herein is a method for encoding computer processes for malicious program detection in a device. The method includes the steps of (a) randomly sampling a trace of system calls collected over a predetermined interval (the observation interval), each system call including context information and memory addresses for the function being monitored; (b) computing system address differences from the trace of system calls and retaining the computed values; (c) forming a group of n-grams (words) of retained differences of system addresses from the trace of system calls; (d) forming a series of process snippets, each process snippet including context information and the retained differences of system addresses; (e) transforming each process snippet to form a compact representation (process dot) comprising a pair of elements $\langle c, a \rangle$, wherein c includes the context information and a is a sparse vector that encodes information derived from the group of n-grams; (f) forming clusters of compact representations; (g) obtaining clusters of compact representations from one or more malicious program-free computers; and (h) comparing the clusters formed in step (f) to those obtained in step (g) and determining the presence of malicious program from the comparison.

In some embodiments, the context information includes a machine identifier, a batch number for the sample, and a timestamp.

In some embodiments, the method further includes the step of determining the frequency of occurrence for each n-gram (word) and creating a dictionary of zeta n-grams, $\mathcal{D}_\zeta$, using the words that correlate with each other above a predetermined threshold.

In some embodiments, the method further includes the steps of selecting one or more of the zeta words to be anchor words; encoding in a vector $a_\zeta$ the probabilities of the anchor words, given that the process snippet contains one or more zeta words; creating a sparse vector $a_\mu$ that estimates the probabilities for the non-zeta words in the process snippet; and combining by direct weighted sum the two vectors into the process dot's vector: $a = b_\zeta a_\zeta \oplus b_\mu a_\mu$ with weights $b_\zeta$ and $b_\mu$.

In some embodiments, the method further includes the step of maintaining a white list of non-zeta words.

In some embodiments, each entry in the vector of the compact representation is proportional to the probability that a feature is observed given an execution environment.

In some embodiments, the predetermined interval is from about four to about six seconds.

In some embodiments, the predetermined interval is five seconds.

In some embodiments, the predetermined interval is chosen from a random distribution with mean of five seconds that is bounded away from zero, such as the exponential distribution with mean four plus one.

In some embodiments, system-call information is sampled without altering any original component of the operating system.

In some embodiments, the method consumes less than 5% of a CPU'S time.

In another aspect, disclosed herein is a method for encoding computer processes for malicious program detection, comprising the steps of: (a) randomly sampling a trace of system calls collected over the predetermined interval, each system call including context information and memory addresses for the function being monitored; (b) computing system address differences from the trace of system calls and retaining the computed values; (c) forming a group of n-grams (words) of retained differences of system addresses from the trace of system calls; (d) forming a series of process snippets, each process snippet including context information and the retained differences of system addresses; (e) transforming each process snippet to form a compact representation (process dot) comprising a pair of elements $\{c, a\}$, wherein c includes the context information and a is a sparse which encodes information derived from the group of n-grams; (f) forming clusters of compact representations; and (g) comparing the clusters formed in step (f) to a library of malicious program samples.

In some embodiments, the context information includes a machine identifier, a batch number for the sample, and a timestamp.

In some embodiments, the method further includes the step of determining the frequency of occurrence for each n-gram (word) and creating a dictionary of zeta n-grams, $\mathcal{D}_\zeta$ with using the words that correlate with each other above a predetermined threshold.

In some embodiments, the method further includes the steps of: selecting one or more of the zeta words to be anchor words; encoding in a vector $a_\zeta$, the probabilities of the anchor words, given that the process snippet contains one or more zeta words; creating a sparse vector $a_\mu$ that estimates the probabilities for the non-zeta words in the process snippet; and combining by direct weighted sum the two vectors into the process dot's vector: $a=b_\zeta a_\zeta + b_\mu a_\mu$ with weights $b_\zeta$ and $b_\mu$.

In some embodiments, the method further includes the step of maintaining a white list of non-zeta words.

In some embodiments, each entry in the vector of the compact representation is proportional to the probability that a feature is observed given an execution environment.

In some embodiments, the predetermined interval is from about four to about six seconds.

In some embodiments, the predetermined interval is five seconds.

In some embodiments, the predetermined interval is chosen from a random distribution with mean of five seconds that is bounded away from zero, such as the exponential distribution with mean four plus one.

In some embodiments, system-call information is sampled without altering any original component of the operating system.

In some embodiments, the method consumes less than 5% of a CPU'S time.

In yet another aspect, disclosed herein is a system for detecting malicious program on at least one computer, comprising: a sensor installed on the at least one computer, the sensor structured and arranged to collect information on the at least one computer's resource utilization; and a machine learning daemon structured and arranged to receive bundles of information from the sensor and determine the probability that the computer is infected with malicious programs.

In some embodiments, the system consisting of the sensor and the machine learning daemon execute in the same device. In other embodiments, the sensor and the machine learning daemon are in separate devices. In other embodiments, there are many sensors communicating to one or several machine learning devices.

In some embodiments, the sensor is on a device that is not professionally managed.

In some embodiments, the communication between the sensor and the machine learning daemon is queued until it can be re-established.

In some embodiments, the system is installed on a managed network of computers having at least one server, each computer having a sensor installed therein.

In some embodiments, the machine learning daemon is installed on the at least one server.

DETAILED DESCRIPTION

FIG. 1 through FIG. 5 provide illustrative, non-exclusive examples of a method and system for malicious program detection, according to the present disclosure, together with elements that may include, be associated with, be operatively attached to, and/or utilize such a method and system.

In FIG. 1 through FIG. 5, like numerals denote like, or similar, structures and/or features; and each of the illustrated structures and/or features may not be discussed in detail herein with reference to the figures. Similarly, each structure and/or feature may not be explicitly labeled in the figures; and any structure and/or feature that is discussed herein with reference to the figures may be utilized with any other structure and/or feature without departing from the scope of the present disclosure.

In general, structures and/or features that are, or are likely to be, included in a given embodiment are indicated in solid lines in the figures, while optional structures and/or features are indicated in broken lines. However, a given embodiment is not required to include all structures and/or features that are illustrated in solid lines therein, and any suitable number of such structures and/or features may be omitted from a given embodiment without departing from the scope of the present disclosure.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a nonexhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods and systems disclosed herein have utility in the identification of one or more malicious threats, such as malicious activities and programs, either human or robotic, in a computing device by an analysis of system calls, according to some embodiments of the present invention. The method allows for the detection of malicious program in a computing device, such as a personal computer, a laptop, a mobile device, such as a smartphone, a computing cloud entity, a router, a server, a tablet, and/or any processor based device. As further described below, the method identifies symptoms of a computing device executing malicious programs, such as a virus, a spyware, a malicious document file, web-based malicious programs, for example a JavaScript and a Flash file, a Trojan, and/or a series of programs already installed in the device but used for unintended purposes. As further described below, the methods and systems disclosed herein allow for identifying symptoms, anomalies, and/or changes in the computing device that indicate it hosts and/or being attacked by a malicious program.

Figure 1:
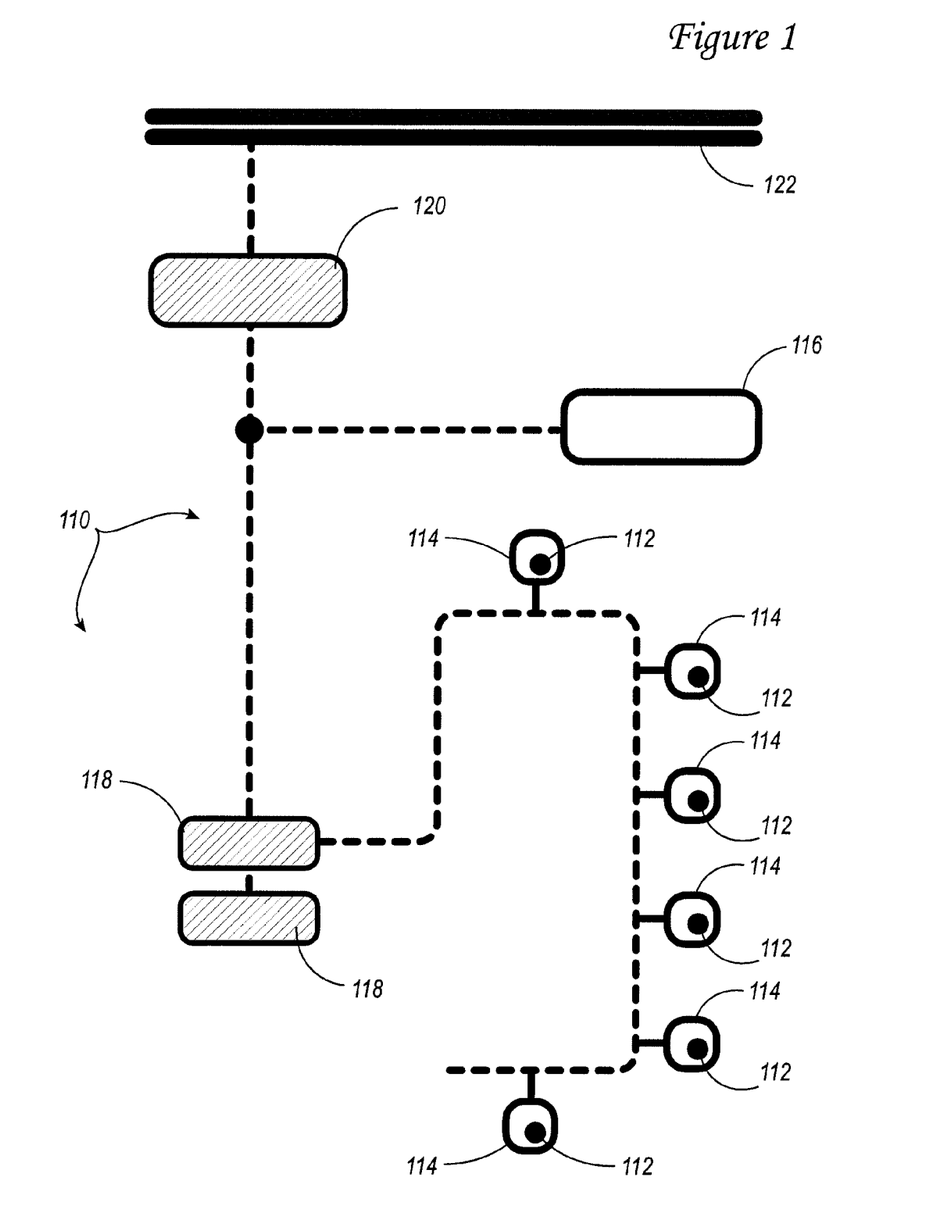
FIG. 1 presents a schematic view of an illustrative, nonexclusive example of a system for malicious program detection, according to the present disclosure.

Referring now to FIG. 1, disclosed herein is a system for malicious program detection 110. System 110 includes one or more sensors 112 installed on one or more computers sought to be protected 114 and a machine learning (ML) daemon 116. In some embodiments, the daemon 116 may execute on the same computer 114 as the sensor 112. In other embodiments, the daemon 116 may execute on another computer, typically a well secured server 118 in a data center. As is typically the case, the well secured server 118 will reside behind a firewall 120 from which the network is connected to the Internet 122. The sensor 112 collects information on computer resource utilization, triages the information, condenses it, and sends small bundles of information to the ML daemon 116. As will be described in more detail below, the daemon 116 collects and analyzes the small bundles of information to determine the probability that a given computer 114 is infected with one or more malicious programs.

The small bundles of information, referred to herein as compact representations or process dots, characterize the behavior of a computer as it executes its programs. By comparing one machine with others like it, the probability that it performs unlike them may be estimated by the daemon's classification programs. This requires having computers in known pristine states, or at least many computers with different rates of malicious program contamination, to train and update the daemon's classification algorithms. The entire process of collecting the data and making the probabilistic assessment may be referred to as sensing.

It is possible to operate the system in another mode, where the determination made is whether the protected system is executing a program from a previously identified exemplar from a family of malicious programs. In this mode, which may be referred to as hunting, the daemon's classification programs are trained on families of malicious programs.

As will be described more fully below, the same technology used for the identification of malicious programs, is also able to group malicious programs into families. As may be appreciated by one of skill in the art, there are on the order of 10 million files archived at online malicious programs repositories such as VirusTotal, although these may be further categorized into families, wherein it is estimated that the number of malicious program families is much smaller. A malicious program family is a collection of different binaries that originate from source code that differs in minor ways.

The data for the compact representations or process dots come mainly from system calls, the basic set of subroutines provided by modern operating systems through which programs interact with the hardware and therefore the environment. For example, it is through the use of system calls that a computer draws images on a screen or sends packets of information over the Internet. In UNIX computers, system calls are described in section 2 of the UNIX manual; in computers using Windows, those functions are not directly exposed to programmers, but are indirectly accessible through an extra layer of subroutines.

Advantageously, the system disclosed herein detects malicious programs while it executes. Denning and Neumann, with their development referred to as IDES, is often credited as the earliest description of an intrusion detection system operating close to real-time. They suggested the use of rules to identify anomalous activity among audit records. The audit records were to be decomposed into elementary operations carried out by the operating system on one object (such as a file, program, or socket). As those skilled in the art will recognize, system calls have been used to assess the elementary operations of a computer and used to create audit logs. Some security systems have been developed based on the analysis of system call sequences.

Obtaining the stream of system calls (a trace) without tasking the CPU, crashing the system, ignoring security privileges, modifying system libraries, or other modifications that alter general expectations of the operating system is a task that is often glossed over in most descriptions of continual end-point monitoring systems. Other systems or methods utilizing data from system calls may also confront difficulties with their machine learning sections or confront difficulties adhering to the operating system's guidelines on resource utilization, an important consideration in battery powered devices.

The system and methods disclosed herein collect data from the Windows operating system through the use of the Event Tracing for Windows (Etw) framework. This framework allows the activity of the computer to be monitored while the computer is executing other programs and without putting undue burden on the processor. Other operating systems have libraries similar to ETW. For the Mac OSX, Solaris, FreeBSD, and other operating systems that borrowed their design considerations from BSD UNIX, the system and methods disclosed herein may be implemented through the use of dtrace; for Linux (and therefore Android), kprobes provides similar functionality for tracing kernel functions. The important feature of these tracing programs is that they collect system call information with little overhead and without modifying the kernel. That is typically done by overwriting a few assembly instructions compiled into the kernel for the specific purpose of being overwritten by the tracing facility, when the tracing is required to be turned on. The alternative methodology of using kernel call wrappers or hooking is not only inefficient but requires altering system libraries in ways that were not considered by the programmers authoring the code using those wrapped or hooked methods, which invariably introduces new bugs into the system.

Until now, authors of malicious program detection systems using system calls eschewed ETW because it does not provide the level of detail they would like to get when monitoring system calls.

Programs executing in computers using a modern operating system rely on system calls to interact with the hardware. The operating system abstracts the hardware for the programmer through layers of libraries. These libraries are often designed to execute in a special, hardware enforced, security mode called kernel mode, to be distinguished from the user mode.

Differentiating between system calls and other code executing, a running program consists of a long sequence of system $call_1(args_1)$ some code system $call_2(args_2)$ some code

⋮

Collecting the full stream is often impractical. The logging either burdens the computing environment, making it appear sluggish to users, or involves strategies that alter the environment in ways not anticipated by its programmers, which invariably, as noted, introduces bugs. A vintage 2013 laptop executes 100,000 system calls per second (or about 50 megabytes of log data per second), making it difficult to stream all the information to disk. Gathering the information is also difficult, with function hooking being a common, but unsatisfactory approach in production systems.

Even if the full log is available, there is still the challenge of designing a procedure that extracts information from the stream. Early systems, such as IDES, relied on rules to detect patterns in the stream, but such methods are now known to be too error prone, difficult to maintain, and have poor coverage for classes of events of interest in computer security. Instead, attempts to use statistical detection techniques have been made. Any system that uses a statistical procedure to make a decision is confronted with the challenge of balancing accuracy of detection with coverage, however. As may be appreciated, a system can be made accurate by never detecting anything, and it can be made to have full coverage by detecting everything. Systems implemented to date have suffered from a false positive rate too high for practical use. Since then, in an attempt to improve the quality of detection, different research groups have suggested a variety of strategies for extracting information from a full log of system calls. Most advocate for the use of the arguments and even the return values of the system calls.

Advantageously, the system and methods disclosed herein do not, in every embodiment, use the full log. Instead, the sensor turns on at randomly distributed times for a predetermined interval. In some embodiments, the predetermined interval may be selected from a range of from about two to about eight seconds; in other embodiments the predetermined interval is chosen from a random distribution, such as the beta distribution or the exponential distribution. This minimizes the load on the computer and decreases the chance that any malicious program running on the same computer will be able to determine for how long system calls are being collected. In the preferred embodiment, the predetermined interval is randomly chosen from an exponential distribution with mean of four seconds to which one is added, an interval that has been found to be sufficiently long to provide enough information to the machine learning daemon for vintage 2013 computers.

The off period may be fixed in some embodiments and randomly distributed in others. In the preferred embodiment the period is chosen from an exponential distribution with a mean of ten seconds. In all embodiments, the random distribution is picked so that any off period, no matter how short, is always possible.

As indicated hereinabove, to collect the information from the ETW (Event Tracing for Windows) framework from the Windows family of operating systems can be used. The ETW Framework has an advantage for professional software; namely, it is developed and maintained by the authors of the operating system.

Other systems that attempt to characterize the functioning of a computer by examining its system calls use some form of function hooking, where the system calls are made to execute code that provides new functionality (such as recording that a call was made to the function), in addition to the original system call code. Hooking breaks one or more software invariants: locking strategies, calling conventions, timing constraints, and many other hard-to-enumerate properties that programmers rely upon. In professionally managed computer networks these invariants play an important role in certifications, internal or external. Computer systems that comply with some set of regulations cannot be modified without needing to be re-certified, making hooking an burdensome modification. As may be appreciated, hooking also slows down the computer. As those skilled in the art recognize, the least burdensome hooked library may slow the computer by approximately 15%, but factors of two or more are common. The slow down arises from the loss of cached context when the operating system switches between kernel and user modes.

Authors of operating systems may introduce system call monitoring more efficiently by understanding the assumptions present when system calls are made. Efficient monitoring uses interrupt handlers that do not perform a full context switch to record information about the computer's operation, since what they are doing is writing a few bytes to a memory region. The need for speed and limited memory consumption limits what these more efficient schemes record.

An issue involving the use of the ETW framework to monitor system calls stems from the fact that the ETW framework does not log an identifier for the system call; only the address of the call in the process's virtual address space is given. These addresses vary across machines, because Windows, like many operating systems, uses Address Space Layout Randomization (ASLR) while loading its libraries. ASLR attempts to defeat a malicious program technique of building arbitrary programs by patching together pieces of existing code. ASLR is now a common feature of operating systems. By careful static analysis of the code it would be possible, after every computer reboot or library reload, to map the addresses given by ETW to function call names (and therefore an identifier). To do this would require the use of a background process, as it can be demanding of system resources. The system and methods disclosed herein avoids this issue.

Using the ETW Framework the system and methods disclosed herein collect a small amount of context, such as a machine identifier, a batch number for the sample, a timestamp, and a process identifier, together with the memory addresses of the functions being monitored. This is done by the sensor component of the system in small batches of the predetermined interval. While the lack of system call identifiers of the ETW Framework may be viewed as an issue, the fact that most system calls are located within the same library and the differences between their addresses remains constant, despite the random layout of a library, can serve to make the information available useful. If we consider the differences of addresses and only retain those that are small (to assure that the functions are in the same library), the quantities obtained are unique for the set of libraries being monitored by ETW.

To take advantage of these fixed differences, the element's machine identifier, batch number and process identifier are grouped by increasing time. In each of these groups, the differences of the addresses of successive system calls in a group are computed, eliminating elements that repeat by the same difference and replacing all differences that exceed a threshold by the value of the threshold. The threshold is chosen to be smaller than the length of the few libraries containing system calls (the value $5 \times 2^{20}$ works for current Windows operating systems).

For each batch of samples from one predetermined interval of system calls, there are several groups of retained differences of addresses, $\{\Delta_i\}$, each distinguished by its context c of machine identifier and process identifier. These differences can be grouped into n-grams by ordering them by the time of collection and further grouping them. For example, for 2-grams, we would have $$\{\langle \Delta_1, \Delta_2 \rangle, \langle \Delta_2, \Delta_3 \rangle, \langle \Delta_3, \Delta_4 \rangle, \ldots \}$$

and $$\{\langle \Delta_1, \Delta_2, \Delta_3 \rangle, \langle \Delta_2, \Delta_3, \Delta_4 \rangle, \langle \Delta_3, \Delta_4, \Delta_5 \rangle, \ldots \}$$

for 3-grams. The n-grams will be called words regardless of the number n of differences that are grouped together. In implementations, the sequences of differences are sequences of integers that are hashed together into one 64 bit integer.

In some embodiments the n-grams are formed from overlapping differences $\Delta_i$, whereas in other embodiments the n-grams are formed from non-overlapping differences.

In the systems and methods disclosed herein, the words of n-grams of retained differences are the raw information collected regarding the behavior of computers. As may be appreciated, with hundreds of system calls, the possible number of words grows too fast with n, making it impractical to collect all call sequences. Instead, we first determine the few hundred most common words, with less than 5000, or less than 2000, or less than 1500, or 1408, being found to be suitable. It is important that this number not be in the millions, for that would render impractical other needed algorithms using current computing technology, or technology likely to become available in the next few years. Other systems that attempt to detect malicious programs using system call sequence need to collect millions of n-grams, due to the low discriminating power of the machine learning tools they utilize.

Observing the set of computers for many hours under diverse usage conditions shows that distribution of different words follows a long-tailed distribution. The observation frequency rank of a word is proportional to a function that goes to zero with ever larger ranks, but at a rate slower than the tail of a normal distribution. That would be the expectation arising from the behavior of complex systems, but it has been observed that, in professionally maintained networks, the fall-off is slower than that of normal distribution, but faster than the power-law typical of complex systems. Knowledge of the decay rate can be used advantageously by those familiar with the art of machine learning.

The sensor used in the methods and systems disclosed herein takes advantage of current practical considerations when collecting system call information from a execution environment, which may be a physical or virtual machine. The sensor computes the retained differences and the needed context information to create what will be defined herein as "process snippets." Thus, a process snippet, which will include the n-gram words $w_i$, may be represented as follows:

$$\langle c, \{w_1, w_2, \ldots, w_{k(c)}\}\rangle.$$

In some embodiments of the methods and systems disclosed herein, some of the functionality of the ML daemon may be placed in the same executable as the sensor. The vector encoding, described below, and some fast and simple classification schemes, help reduce network traffic when the ML daemon and the sensor are not in the same execution environment.

Using well managed devices, statistics on the frequency of words are first collected. Not all words will occur often enough to be of statistical significance. The most frequent words or n-grams (as previously indicated, selected to be in the preferred embodiment 1408), are used to create a special dictionary $\mathcal{D}_\zeta$ of zeta words (or n-grams) that are encoded differently from words not in the dictionary. Of the remaining words, some have very little predictive value for malicious program detection, so as they are discovered some of them are randomly incorporated into another dictionary, $\mathcal{D}_W$, of white listed words. Those words neither in the white list $\mathcal{D}_W$, nor a zeta word, $\mathcal{D}_\zeta$, will only be considered relevant to the sensor if produced frequently enough by some process. As may be appreciated by those skilled in the art, both the dictionary of zeta words, $\mathcal{D}_\zeta$, and the white list, $\mathcal{D}_W$, will be different for every installation, forcing any attacker attempting to use a mimicry attack to first learn the statistical distributions used by the particular instance and therefore making it harder for the attacker to hide.

Most algorithms used in machine learning expect to receive vectors as inputs, but the process snippets are not in that format. Each consists of a pair of elements: the context, which is categorical; and a multi-set of words or, using an interpretation common in the machine learning literature, a bag-of-words. A bag-of-words tends to be an efficient representation for natural language documents, as the number of English words tends to be small, a few thousand typically, but in the case of the process snippets the number of n-grams or words could be in the millions.

Advantageously, the systems and methods disclosed herein utilize a highly efficient representation of the process snippets. In some embodiments, a process snippet is transformed into a "process dot" that compactly encodes the execution information arising from the context of the process snippet into a vector of features, making the process dot effective in statistical machine learning algorithms.

As defined herein, a process dot consists of a pair of elements $\langle c, a \rangle$, which are derived from a process snippet: the context c, with information about the machine, the process, and batch number, are copied and a sparse vector a computed to encode the information about the words from the process snippet in a form suitable for machine learning algorithms. The entry $a_i$, of the vector is proportional to the probability that a feature, $f_i$, is observed when the execution environment is c:

$$a_i \propto \Pr(f_i|c).$$

As may be appreciated, the features are related to the words. Choosing a good set of features is important as the effectiveness of machine learning hinges upon that selection. The words appear to be natural features, but their correlations within process snippets diminishes their effectiveness. For example, when detecting malicious programs, a rare word in a process snippet may have different implications as compared to any of the most common words. A more effective encoding uses features that have approximately equal weight and are mutually independent, which requires that information concerning the common words be condensed. Advantageously, this is achieved by treating the zeta words differently than the least common ones. The process steps to accomplish this include:

1. Creating a dictionary $\mathcal{D}_\zeta$, using the words that correlate with each other above a predetermined threshold.
2. Selecting some of the zeta words to be anchor words. These will be the features used to represent any subset of zeta words.
3. Encoding in a vector, $a_\zeta$, the probabilities for the anchor words given that the process snippet contains some zeta words.
4. Creating another sparse vector $a_\mu$ estimating the probabilities for the other, non-zeta words, in the process snippet.
5. Combining by direct weighted sum the two vectors into the process dot's vector: $a = b_\zeta a_\zeta \oplus b_\mu a_\mu$ with weights $b_\zeta$ and $b_\mu$.

In some embodiments, the steps are performed as follows:

To select the anchor words, the set of all possible words is used. This set is large but finite. If the length of the longest n-gram of retained differences is capped, in the preferred embodiment at 4, and with approximately 200 system calls, that would limit the dictionary to about $10^{16}$ possible words (for Unix, Windows has about Boo system calls for about $10^{20}$ possible words). Even at the full rate of 100,000 system calls per second of vintage 2013 computers, it is hard to collect meaningful statistics for such a large number of words. Yet, there are words that appear repeatedly in a log of system calls. Even for logs taken over 15 minutes, several tens of thousands of words are seen, although the 5000 th ranked word has a count less than 0.1% of the most frequent one.

To determine the words that occur together, a correlation matrix C, which is positive and symmetric, is formed. For every word $w_i$ seen in a process snippet, we compute the number of times, $C_{i,j}$, the word occurs in any process snippet with another word $w_j$. The set of words that occur above a certain threshold are included in the dictionary $D_\zeta$. The diagonal element $C_{i,i}$ is the number of times the word $w_i$ was observed.

Figure 2:
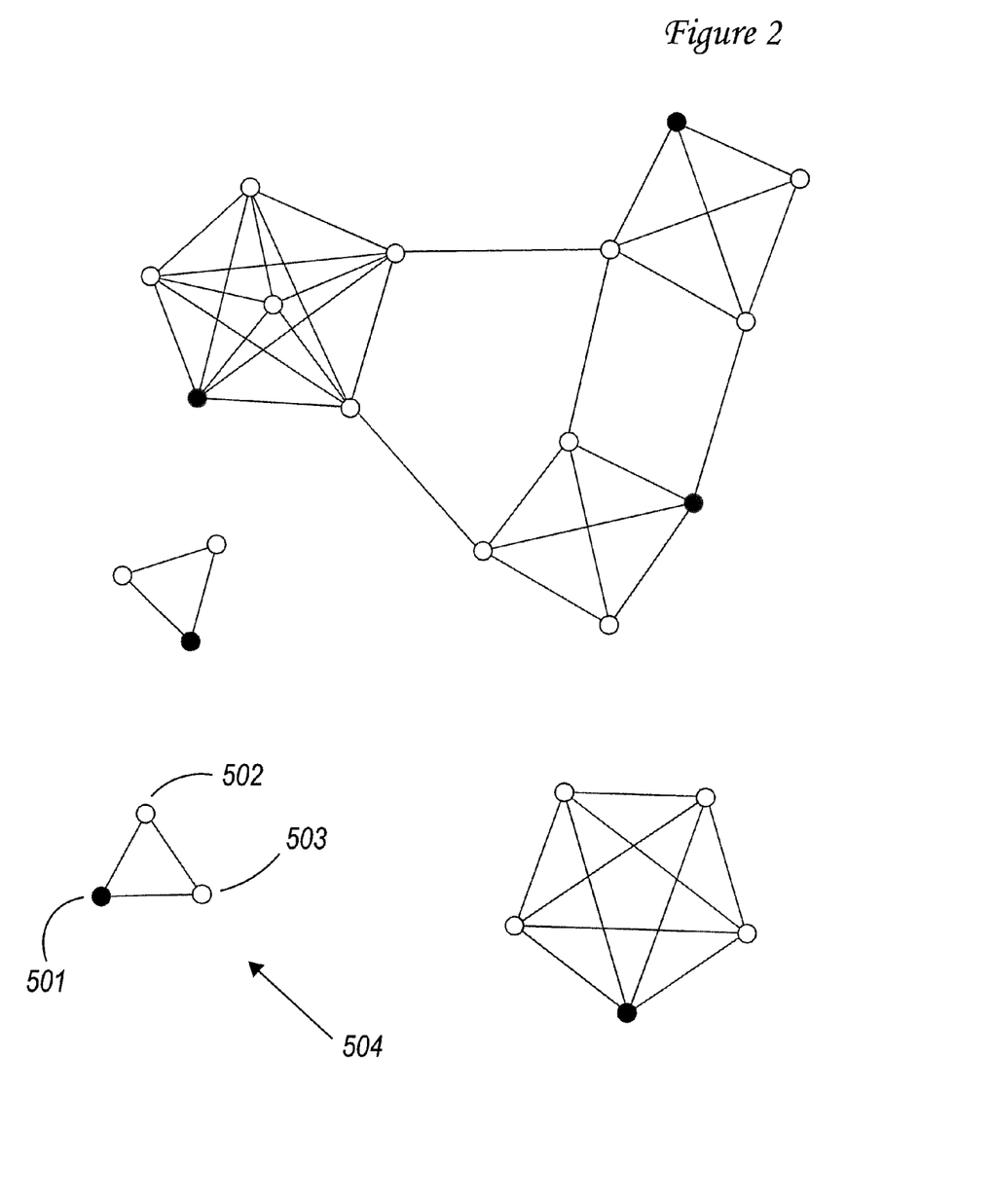
FIG. 2 is a schematic diagram of how the anchor zeta words are chosen among the clusters of similar words. Realistic examples have many more nodes and edges.

To select the anchor words a graph may be built, as illustrated in FIG. 2. The nodes of this graph are the zeta words. In FIG. 2 the zeta words are represented as closed 501 or open circles 502 and 503. Two words are connected if they co-occur often enough in the same process snippet, as are 502 and 503. The nodes of the graph are clustered by one of the many graph (or matrix) clustering algorithms. In some embodiments, the nodes are clustered using a spectral embedding technique. The nodes are then numbered sequentially, one cluster at a time. Item 504 is one of the four clusters in the diagram of FIG. 2. Within a cluster all nodes will differ by one from another node in the same cluster. In one embodiment, 10% of the nodes are chosen as anchor points, uniformly on their sequence number. Other embodiments use different random selection procedures that may emphasis some clusters. The chosen nodes indicated by the closed circles, such as 501, are the features used to encode the information on zeta words.

To encode the zeta words, the values $[a_\zeta]_m$ of the components of the vector $a_\zeta$, corresponding to the anchor words, are set to the probability that one of the anchor words $w_m$ could have been observed given the context c. Depending on the chance of how the sensor sampled the process mentioned in the context c, the anchor word $w_m$ has some probability of being observed together with the many other combinations of zeta words. This can be expressed, as the following conditional probability:

$$[a_\zeta] = \mathbb{P}r\ (w_m|\{w_i\},c),$$

where the set $w_i$ contains the zeta words observed in the process snippet. The anchor word may not be among those words, but that is seen in this model as a random event due to how the processes are sampled. By the use of the inclusion-exclusion expansion, the lower bound (and good approximation) may be written as:

$$[a_\zeta]_m = \mathbb{P}r\ (w_m|c) \geq \max_j \mathbb{P}r\ (w_m|w_j, c).$$

The $\mathbb{P}r\ (w_m|w_j, c)$ may be estimated by setting it to be proportional to the similarity measure between the words and the anchors and average over all observed c. In some embodiments, the similarity measure to anchor words is built by taking advantage of the spectral embedding of the co-occurrence matrix. In the "spectral space" each zeta word $w_j$ has a list of nearest neighbors. The three nearest distances to any of the anchor words is taken as the three non-zero entries for the vector of values $\mathbb{P}r\ (w_m|w_j)$ representing word $w_j$ in the spectral space. Using a larger number of zeta words, would have kept a few more non-zero components.

The mu words, which are all the other words that are not in the dictionary of zeta words, are encoded in a sparse vector $a_\mu$ with a limited number of non-zero entries. In one embodiment the number of mu words is limited to ten. Any process snippet will only have a few mu words, so it can be difficult to estimate the probability for that word being observed, given the context. The estimation is carried out using Bayesian methods, where we assume an a priori probability model for the mu words independent of the context.

It has been discovered that not all mu words assist in classifying process dots, so a white list of mu words is also maintained that does not need to be included in the vectors of process dots, as those words do not contribute information to the machine learning algorithms.

Creating the process dots is done in conjunction with the machine learning algorithms that will use them. Many of those algorithms can be expressed in terms of a kernel function that provides the similarity of two inputs; two process dots in this case. As those skilled in the art will recognize, kernel functions simplify the engineering of machine learning algorithms. Their design encodes most domain knowledge needed to solve a problem at hand, after which more general methods can be used to manipulate the kernel function.

The stream of system calls is, from the perspective of machine learning algorithms, a multi-dimensional categorical time-series. It is a time-series because the elements in the stream can be ordered by increasing values of their time stamps; it is categorical because the system calls are elements of a set with no special order among them; and multi-dimensional because strong causal dependencies among calls is restricted to calls made by the same process, making each process a separate dimension. There are no general or effective algorithms known today to handle this class of time-series.

While the preferred method for analyzing the steam of system calls would have been a time-series method, practical considerations first group the words into small units. Within each group the ordering of the words is ignored. Such representation is known in the art as a bag-of-words representation. As more computing resources become available, some of the time-dependency is put back into the analysis by treating small sequences of words (e.g., two to five) as one "word" (an n-gram) and resorting to previously developed bag-of-words algorithms.

Any similarity function for a bag-of-words can be constructed by introducing a Boolean vector of entries indexed by the possible elements or subsets of the bag-of-words and then using a similarity function for Boolean vectors. Some set similarities are also distances, such as the Jaccard distance, the Hamming distance, or cosine distance. Another possibility for bag-of-words is to create a vector of counts indexed by the words, with the counts weighed by corpus and word statistics. Distances behave as dissimilarity functions and similarity functions can be derived from dissimilarity functions.

Similarity functions between bag-of-words that are treated as sets are not very effective because the elements in the bag-of-words are not mutually conditionally independent. If x and y are two different words in a bag-of-words B, they will be conditionally independent when their joint probability $\mathbb{P}r\ (x \wedge y|B')$ given the other words $B'=B\backslash\{x,y\}$ factors as if x and y where independent, $\mathbb{P}r\ (x \wedge y|B') = \mathbb{P}r\ (x|B') \mathbb{P}r\ (y|B')$. If all the pairs of words in a bag-of-words are conditionally independent, then the bag-of-words has mutually conditionally independent words. As a rule-of-thumb, the better the approximation to conditional independence, the better one of the classic set distance functions will be at providing a dissimilarity among sets.

Process dots, as disclosed herein, transform the information contained in a process snippet, so that the elements in the vector are as mutually independent as practically permitted, while maintaining the sparsity requirements. Because of this construction, we can use simple modifications of common vector similarity functions: we treat the zeta part of the vector and the mu part separately and we scale in a log-like manner that accounts for the mu part.

In some embodiments, the similarity function is computed as follows: eliminate process dots that have small predictive value; form a graph with process dots as nodes connected by edges when they are similar; identify nodes with sufficient degree and curvature; induce the sub-graph consisting only of nodes identified as having high curvature from and edges that connect pairs of such vertices; find community clusters within the sub-graph; and compare the clusters as sets of nodes, disregarding the edges.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein, the term random is applied to several actions which should be interpreted as an application of formal and mathematical probability theory to natural phenomena, man-made devices, or engineered processes. When random modifies sample, select, pick, incorporate, or other such verbs, an algorithm is implied that uses a random oracle (in the computer science sense of a theoretical black box). Such algorithms are often realized or implemented by using a random number generator, which makes them technically pseudo-random, but such terms and usages are common in the art. Such algorithms require the choice of a distribution for the random numbers. The art often, implicitly, assumes a uniform bounded distribution, but herein, other distributions are implied, including the distribution with only one item (sometimes referred to as the Dirac delta distribution). It is also known in the art that often a random algorithm can be converted into a non-random algorithm by using low-discrepancy methods, and such transformations are also understood as being part of the art of handling random processes in devices.

In the event that any patents, patent applications, or other references are incorporated by reference herein and define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

Example 1

Figure 3:
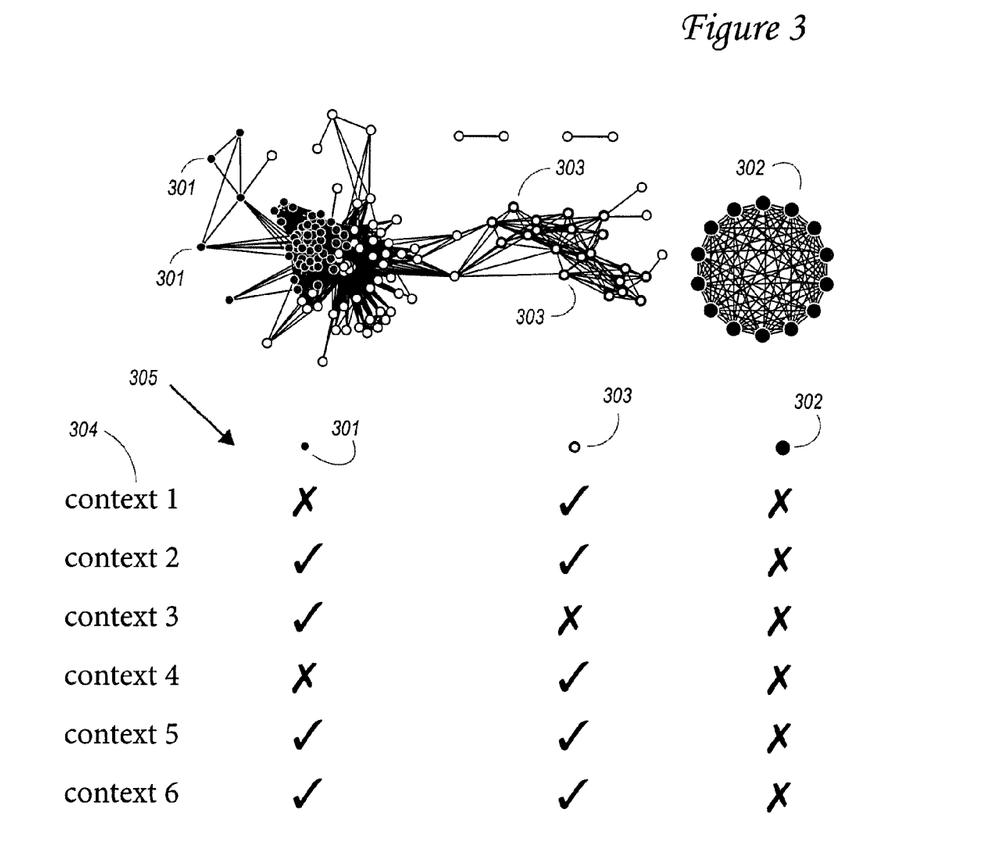
FIG. 3 presents a graphical depiction of the steps to compute a similarity function using a Hesperus malicious program variant, according to the present disclosure.

When applied to the Hesperus malicious program (the variant with MD5 checksum d3c7 d6d1 0cd6 f380 9c4c a837 ba9a e2e8$_{(16)}$), the methods and systems disclosed herein detect it despite not having been trained on any of its variants. The similarity functions utilized take as input collections of process dots. They are used in FIG. 3 to form the illustrated network, where nodes correspond to process dots and any two are connected by an edge if they have similarity above a threshold. The nodes in the graph that are part of a tight cluster resembling a complete graph are filled differently. In FIG. 3 they correspond to nodes that are either filled 301 and 302 or have a thick border 303. The different contexts 304 correspond to machines that are free of malicious programs. Each tight cluster is compared to the clusters arisen from these contexts 304 to create the table of checks 305, indicating whether the cluster is similar or not to a cluster in that context. In the table 305, for example, the clusters arising from context 2 were similar to the tight cluster of elements 301 and to the tight cluster of elements 303, but none of the clusters from context 2 were similar to the tight cluster of elements 302. Once compared to all the clusters arising from a diversity of contexts, the tight cluster of 302 elements (which upon later analysis were found to consists exclusively of explorer .exe process dots) were found dissimilar to clusters from all six contexts. Therefore, it was classified by the system as potential malicious programs.

Example 2

Figure 4:
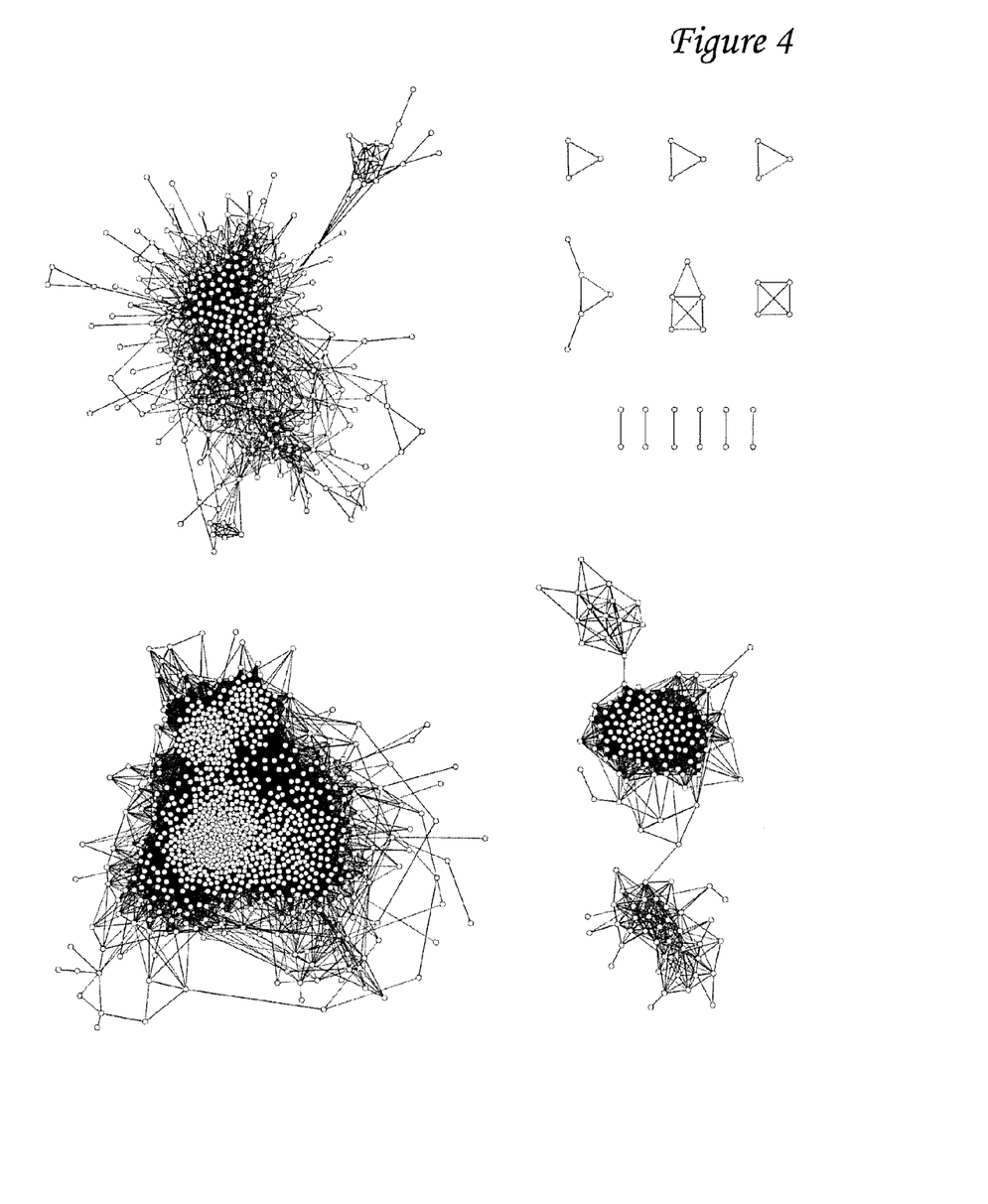
FIG. 4 presents a plot of the structure of the Zeus family of malicious programs.

Referring now to FIG. 4, the structure of the Zeus family, a malicious program used to capture banking credentials from unsuspecting users, is shown. As of 2014, this malicious program is considered challenging to most detection systems. In FIG. 4, each black dot stands for different binary executable identified as Zeus by researchers in the computer security industry. They are connected by an edge when the system herein disclosed identifies them as operating system in similar fashion. The graph is then drawn using an implementation of the spring embedding algorithm with electrical repulsion, so that dots with many common neighboring dots tend to be drawn together. Further, the 1634 variants analyzed have compilation times spanning several years, suggesting variability, yet they were all identified by comparing the compact representations or process dots of one example to all others.

Example 3

To assess the effectiveness of the methods and systems disclosed herein, 50 malicious program samples from six named advanced persistent threat (APT) families, one collection of uncategorized APT malicious programs, and one family that uses an advanced code injection technique to hide itself, were profiled. None of these were used in creating the zeta words. For that, common productivity applications for Windows, and a collection of 50 historical malicious programs were used. When run on the test samples, the system identified malicious programs in 70% of the cases, including at least one sample from each of the families. This rate is comparable to detection rates achieved by traditional antivirus methods based on file signatures, after the sample has been made known to the antivirus program. These programs typically achieve detection rates of about 10% to 15% on previously-unknown samples, as can be seen from websites such as VirusTotal.

As may be seen, the systems and methods disclosed herein offer several advantages over previous systems for malicious program detection. These include, but are not limited to, the deployment of a sensor that collects system call information without altering any original component of the operating system. The sensor collects information about the activities of a computer, and has been demonstrated to do so while consuming less than 5% of a CPU'S time. Moreover, the sensor collects its data while respecting battery usage guidelines for the operating system. Malicious programs can be detected with the limited information provided by the sensor. A compact encoding advantageously takes into account the long-tailed frequency statistics of system call sequences. The methods employed select a set of features so that the encoding is sparse.

Other benefits include the fact the compact representations employed can be used to characterize to machine learning algorithms, the behavior of computer processes. As described hereinabove, the compact representation can be used to detect a malicious program as it executes. Each entry in the vector of the compact representation is proportional to the probability that a feature is observed given an execution environment. Features are chosen so that each entry is, within practical limits, is independent of other entries. Surprisingly, the compact representation can be used to detect malicious programs never before identified by the system using the representation.

Provided herein is a sensor that collects at random intervals and runs for a fixed time that is sufficiently long in CPU execution time but short in user time. Given a short sample of the activity of a process, the sensor can transform the information into a vector of features effective for statistical machine learning algorithms.

Other uses of the systems and methods disclosed herein include: system debugging, where timing matters; providing a measure of the health of a local area network; and building a global state machine for a complex program.

The embodiments disclosed herein, as illustratively described and exemplified hereinabove, have several beneficial and advantageous aspects, characteristics, and features. The embodiments disclosed herein successfully address and overcome shortcomings and limitations, and widen the scope, of currently known teachings.

Figure 5:
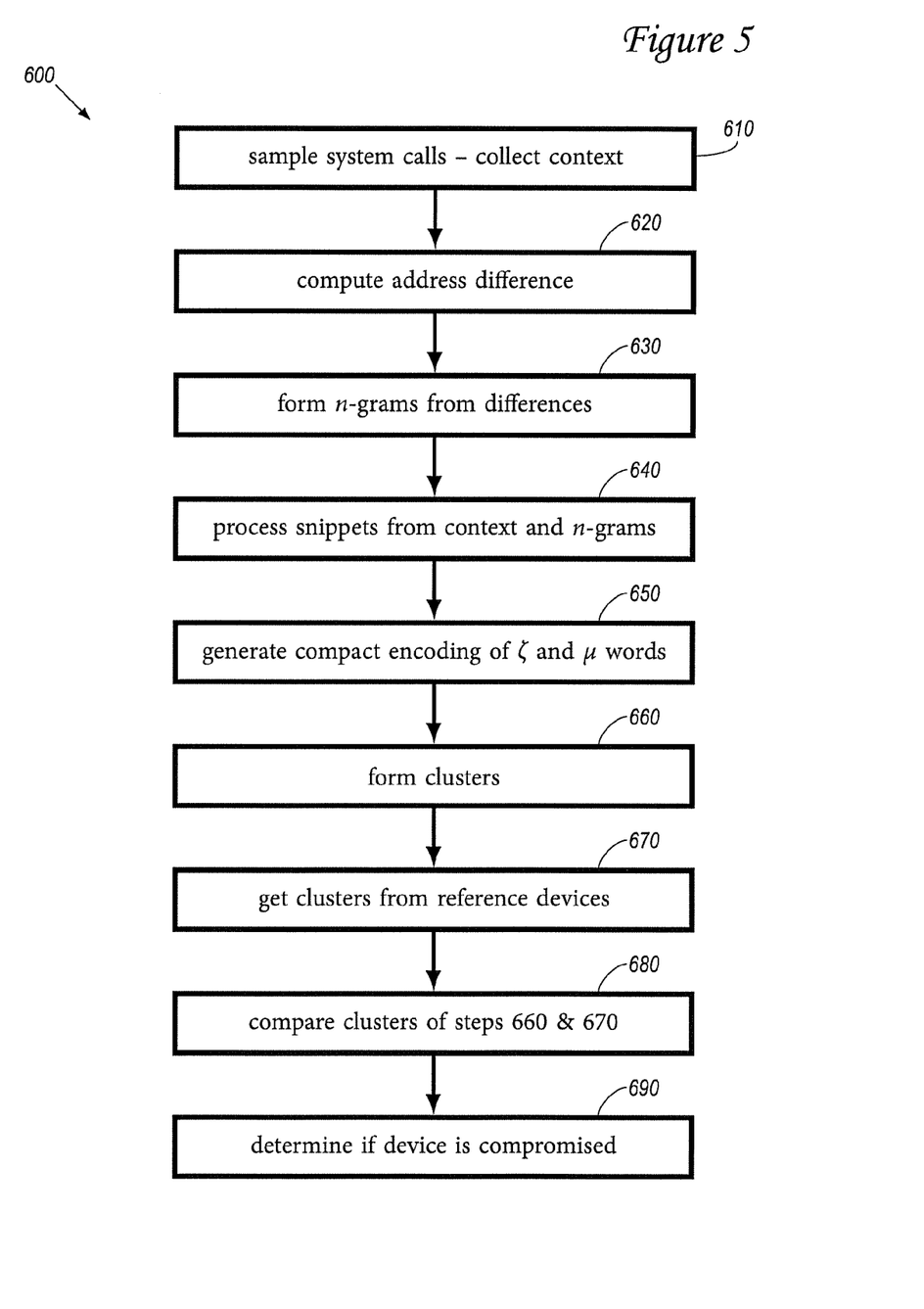
FIG. 5 presents a flow chart for a method for encoding computer processes for malicious program detection in a network of managed computers, according to the present disclosure.

Referring now to FIG. 5, the present invention may be now understood to provide a method 600 for encoding computer processes for malicious program detection in a managed network of computers comprising: step 610, randomly sampling a trace of system calls collected over a predetermined interval, each system call including context information and memory addresses for the function being monitored; step 620, computing system address differences from the trace of system calls and retaining the computed values; step 630, forming a group of n-grams (words) of retained differences of system addresses from the trace of system calls; step 640, forming a series of process snippets, each process snippet including context information and the retained differences of system addresses; step 650, transforming each process snippet to form a compact representation (process dot) comprising a pair of elements {c, a}, wherein c includes the context information and a is a sparse which encodes information derived from the group of n-grams; step 660, forming clusters of compact representations; step 670, obtaining clusters of compact representations from one or more malicious program-free computers; and step 680, comparing the clusters formed in step 660 to those obtained in step 670; and step 690, determining the presence of malicious programs from the comparison.

Illustrative, non-exclusive examples of apparatus and methods according to the present disclosure have been presented. It is within the scope of the present disclosure that an individual step of a method recited herein, including in the following enumerated paragraphs, may additionally or alternatively be referred to as a "step for" performing the recited action.

INDUSTRIAL APPLICABILITY

The apparatus and methods disclosed herein are applicable to the computer, mobile device, networking and intrusion detection industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

We claim:

1. In a managed network of computers, a method for encoding computer processes for malicious program detection, comprising the steps of:
   (a) randomly sampling a trace of system calls collected over an observation interval, each system call including context information and memory addresses for a function being monitored;
   (b) computing system address differences from the trace of system calls and retaining computed values;
   (c) forming a group of n-grams (words) of retained differences of system addresses from the trace of system calls;
   (d) forming a series of process snippets, each process snippet including the context information and the retained differences of system addresses;
   (e) transforming each process snippet to form a compact representation (process dot) comprising a pair of elements (c, a), wherein c includes the context information and a is a sparse vector that encodes information derived from the group of n-grams;
   (f) forming clusters of compact representations;
   (g) obtaining clusters of compact representations from one or more malicious program-free computers; and
   (h) comparing the clusters formed in step (f) to the clusters obtained in step (g) and determining presence of a malicious program from the comparison.

2. The method of claim 1, wherein the context information includes a machine identifier, a batch number for the sample, and a timestamp.

3. The method of claim 2, further comprising the step of determining a frequency of occurrence for each n-gram (word) and creating a dictionary of zeta n-grams, $D_\zeta$, by using words that correlate with each other above a predetermined threshold.

4. The method of claim 3, further comprising the steps of: selecting one or more of the zeta words to be anchor words; encoding in a vector $a_\zeta$, the probabilities of the anchor words, given that the process snippet contains one or more zeta words; creating a sparse vector $a_\mu$, that estimates the probabilities for the non-zeta words in the process snippet; and combining by direct weighted sum the vector $a_\zeta$ and the parse vector $a_\mu$ into the sparse vector a of the process dot:

$$a = b_\zeta a_\zeta \oplus b_\mu a_\mu \text{ with weights } b_\zeta \text{ and } b_\mu.$$

5. The method of claim 4, further comprising the step of maintaining a white list of non-zeta words.

6. The method of claim 4, further comprising the step of maintaining a white list of non-zeta words that are randomly selected among possible candidates.

7. The method of claim 4, wherein each entry in the sparse vector a of the compact representation is proportional to a probability that a feature is observed given an execution environment.

8. The method of claim 1, wherein a waiting period is chosen from a random exponential distribution before repeating the steps of claim 1.

9. The method of claim 1, wherein the observational interval is chosen from a random distribution where the mean of the distribution is optimized to increase the detection rate of a system while maintaining a CPU usage below an upper bound.

10. The method of claim 9, wherein the observational interval is five seconds.

11. The method of claim 1, wherein system-call information is sampled without altering any original component of any operating system.

12. The method of claim 1, wherein the method consumes less than 5% of a CPU'S time.

13. A method for encoding computer processes for malicious program detection, comprising the steps of:
   (a) randomly sampling a trace of system calls collected over a predetermined interval, each system call including context information and memory addresses for a function being monitored;
   (b) computing system address differences from the trace of system calls and retaining computed values;
   (c) forming a group of n-grams (words) of retained differences of system addresses from the trace of system calls;
   (d) forming a series of process snippets, each process snippet including the context information and the retained differences of system addresses;
   (e) transforming each process snippet to form a compact representation (process dot) comprising a pair of elements (c, a), wherein c includes the context information and a is a sparse vector that encodes information derived from the group of n-grams;
   (f) forming clusters of compact representations; and
   (g) comparing the clusters formed in step (f) to a library of malicious programs samples.

14. The method of claim 13 wherein a library of non-malicious program samples is obtained dynamically from other devices that are deemed free of malicious activity based on a majority rule.

15. The method of claim 13, wherein the context information includes a machine identifier, a batch number for the sample, and a timestamp.

16. The method of claim 13, wherein there is a waiting period chosen from a random exponential distribution before repeating the steps of claim 13.

17. The method of claim 16, further comprising the step of determining a frequency of occurrence for each n-gram (word) and creating a dictionary of zeta n-grams, $D_\zeta$, by using words that correlate with each other above a predetermined threshold.

18. The method of claim 17, further comprising the steps of: selecting one or more of the zeta words to be anchor words; encoding in a vector $a_\zeta$, the probabilities of the anchor words, given that the process snippet contains one or more zeta words; creating a sparse vector $a_\mu$, that estimates the probabilities for the non-zeta words in the process snippet; and combining by direct weighted sum the vector $a_\zeta$ and the sparse vector $a_\mu$ into the sparse vector a of the process dot:

$$a = b_\zeta a_\zeta \oplus b_\mu a_\mu \text{ with weights } b_\zeta \text{ and } b_\mu.$$

19. The method of claim 18, further comprising the step of maintaining a white list of non-zeta words.

20. The method of claim 18, further comprising the step of maintaining a white list of non-zeta words that are randomly selected among possible candidates.

21. The method of claim 18, wherein each entry in the sparse vector a of the compact representation is proportional to a probability that a feature is observed given an execution environment.

22. The method of claim 13, wherein the predetermined interval is chosen from a random distribution where the mean of the distribution is optimized to increase a detection rate of a system while maintaining a CPU usage below an upper bound.

23. The method of claim 22, wherein the predetermined interval is five seconds.

24. The method of claim 13, wherein system-call information is sampled without altering any original component of any operating system.

25. The method of claim 13, wherein the method consumes less than 5% of a CPU'S time.

26. The method of claim 13 where the computer processes are executing in a managed network of computers.

27. A system for detecting a malicious program comprising: at least one computer; a sensor installed on the at least one computer, the sensor structured and arranged to collect information on resource utilization of the at least one computer; and a machine learning daemon structured and arranged to receive bundles of information from the sensor and determine a probability that the computer is infected with a malicious program, wherein the sensor and machine learning daemon are structured and arranged to:
randomly sample a trace of system calls collected over a predetermined interval, each system call including context information and memory addresses for a function being monitored;
compute system address differences from the trace of system calls and retaining computed values;
form a group of n-grams (words) of retained differences of system addresses from the trace of system calls;
form a series of process snippets, each process snippet including the context information and the retained differences of system addresses;
transform each process snippet to form a compact representation (process dot) comprising a pair of elements (c, a), wherein c includes the context information and a is a sparse vector that encodes information derived from the group of n-grams;
form clusters of compact representations; and
compare the clusters formed to a library of malicious program samples.

28. The system of claim 27, wherein the context information includes a machine identifier, a batch number for the sample, and a timestamp.

29. The system of claim 27, wherein there is a waiting period chosen from a random exponential distribution before repeating the steps of claim 27.

30. The system of claim 29, further comprising the step of determining a frequency of occurrence for each n-gram (word) and creating a dictionary of zeta n-grams, $D_\zeta$, by using words that correlate with each other above a predetermined threshold.

31. The system of claim 30, further comprising the steps of: selecting one or more of the zeta words to be anchor words; encoding in a vector $a_\zeta$, the probabilities of the anchor words, given that the process snippet contains one or more zeta words; creating a sparse vector $a_\mu$ that estimates the probabilities for the non-zeta words in the process snippet; and combining by direct weighted sum the vector $a_\zeta$ and the sparse vector $a_\mu$ into the sparse vector a of the process dot:

$$a = b_\zeta a_\zeta \oplus b_\mu a_\mu \text{ with weights } b_\zeta \text{ and } b_\mu.$$

32. The system of claim 31, further comprising the step of maintaining a white list of non-zeta words.

33. The method of claim 31, further comprising the step of maintaining a white list of non-zeta words that are randomly selected among possible candidates.

34. The system of claim 31, wherein each entry in the sparse vector a of the compact representation is proportional to a probability that a feature is observed given an execution environment.

35. The system of claim 27, wherein the predetermined interval is chosen from a random distribution where the mean of the distribution is optimized to increase a detection rate of the system while maintaining CPU usage below an upper bound.

36. The system of claim 35, wherein the predetermined interval is five seconds.

37. The system of claim 27, wherein system-call information is sampled without altering any original component of any operating system.

38. The system of claim 27, wherein the system is installed on a managed network of computers having at least one server, each computer having a sensor installed therein.

39. The system of claim 27, wherein the machine learning daemon is installed on the at least one server.

40. The system of claim 27, wherein communication between the sensor and the machine learning daemon can be queued until later re-established.

* * * * *